US010821431B1

(12) United States Patent
Lew et al.

(10) Patent No.: US 10,821,431 B1
(45) Date of Patent: Nov. 3, 2020

(54) ALUMINUM-SUBSTITUTED CIT-15, ITS SYNTHESIS AND USE

(71) Applicant: CHEVRON U.S.A. INC., San Ramon, CA (US)

(72) Inventors: Christopher Michael Lew, Alameda, CA (US); Kurt Owen Jensen, Richmond, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 16/838,104

(22) Filed: Apr. 2, 2020

Related U.S. Application Data

(60) Provisional application No. 62/834,694, filed on Apr. 16, 2019.

(51) Int. Cl.
| | |
|---|---|
| *C01B 39/06* | (2006.01) |
| *B01J 29/04* | (2006.01) |
| *B01J 37/06* | (2006.01) |
| *B01J 6/00* | (2006.01) |
| *C10G 73/02* | (2006.01) |
| *C01B 39/02* | (2006.01) |
| *B01J 29/70* | (2006.01) |

(52) U.S. Cl.
CPC .............. *B01J 37/06* (2013.01); *B01J 6/001* (2013.01); *B01J 29/047* (2013.01); *C01B 39/026* (2013.01); *C01B 39/06* (2013.01); *C10G 73/02* (2013.01); *B01J 29/70* (2013.01)

(58) Field of Classification Search
CPC ....... C01B 39/026; C01B 39/06; B01J 29/047; B01J 29/70; C10G 73/02
See application file for complete search history.

(56) References Cited

U.S. PATENT DOCUMENTS

| | | | |
|---|---|---|---|
| 10,155,666 | B2 | 12/2018 | Zones |
| 2016/0346771 | A1 | 12/2016 | Schmidt et al. |
| 2017/0252729 | A1 | 9/2017 | Schmidt et al. |

OTHER PUBLICATIONS

Kang, "I. Shape Selectivity of Small-pore Molecular Sieves for the Methanol-to-Olefins Reaction and II. Synthesis and Topotactic Transformation of Germanosilicate CIT-13", California Institute of Technology Pasadena, California, 2019 (Year: 2019).*
Kang et al, "Transformation of Extra-Large Pore Germanosilicate CIT-13 Molecular Sieve into Extra-Large Pore CIT-5 Molecular Sieve", Chem Mater 2019, 9777-9787 (Year: 2019).*
P. Eliasova, M Opanasenko, P.S. Wheatley, M. Shamzhy, M. Mazur, P. Nachtigall, W.J. Roth, R.E. Morris and J. Cejka "The ADOR mechanism for the synthesis of new zeolites" Chem. Soc. Rev. 2015, 44, 7177-7206.

(Continued)

*Primary Examiner* — David M Brunsman (57) ABSTRACT

A method is provided for the synthesis of aluminum-containing forms of molecular sieve CIT-15. The method includes treating an aluminogermanosilicate CIT-13 molecular sieve with water under conditions sufficient to degermanate at least a portion of the aluminogermanosilicate CIT-13 molecular sieve to provide a phyllosilicate comprising delaminated cfi-layers; and calcining the phyllosilicate under conditions sufficient to convert the phyllosilicate to an aluminogermanosilicate CIT-15 molecular sieve.

9 Claims, 6 Drawing Sheets

(56) References Cited

OTHER PUBLICATIONS

D.S. Firth, S.A. Morris, P.S. Wheatley, S.E. Russell, A.M.Z. Slawin, D.M. Dawson, A. Mayoral, M. Opanasenko, M. Polozij, J. Cejka, P. Nachtigall and R.E. Morris "Assembly—Disassembly—Organization—Reassembly Synthesis of Zeolites Based on cfi-Type Layers" Chem. Mater. 2017, 29, 5605-5611.

X. Liu, W. Mao, J. Jiang, X. Lu, M. Peng, H. Xu, L. Han, S-A. Che and P. Wu "Topotactic Conversion of Alkali-Treated Intergrown Germanosilicate CIT-13 into Single-Crystalline ECNU-21 Zeolite as Shape-Selective Catalyst for Ethylene Oxide Hydration" Chem. Eur. J. 2019, 25, 4520-4529.

* cited by examiner

ALUMINUM-SUBSTITUTED CIT-15, ITS SYNTHESIS AND USE

CROSS-REFERENCE TO RELATED APPLICATIONS

This application claims priority to and the benefit of U.S. Provisional Application Ser. No. 62/834,694, filed Apr. 16, 2019.

FIELD

This disclosure relates to molecular sieve CIT-15 having aluminum atoms incorporated into the molecular sieve framework structure, its synthesis and its use in organic conversion processes.

BACKGROUND

Germanosilicate CIT-13 is a disordered molecular sieve with a two-dimensional pore system possessing pores that are bounded by 14- and 10-rings. The framework structure of CIT-13 may be described in terms of silica-rich cfi-layers connected via germania-rich double 4-ring (d4r) composite building units between the layers. The two-dimensional silica-rich cfi-layers are so-called because they contain cas, mtt and ton composite building units found in the CIT-5 (CFI) framework structure. The framework structure of CIT-13 has been assigned the code *CTH by the Structure Commission of the International Zeolite Association.

The composition and characterizing X-ray diffraction pattern of CIT-13 are disclosed in U.S. Patent Appl. Pub. No. 2016/0346771, which also describes the synthesis of the molecular sieve using substituted benzyl-imidazolium organic structure directing agents.

Germanium atoms preferably occupy specific sites, such as d4r units, within germanosilicate frameworks. Due to the relatively weak Ge—O-T (T=Si or Ge) bonds in the d4r units, post-synthetic treatment of a parent germanosilicate can be exploited to prepare molecular sieves with new framework structures that otherwise may be difficult to synthesize by direct hydrothermal synthesis. One such synthetic strategy for effecting such transformations is the Assembly-Disassembly-Organization-Reassembly (ADOR) methodology described, for example, by P. Eliášová et al. (Chem. Soc. Rev. 2015, 44, 7177-7206).

U.S. Patent Appl. Pub. No. 2017/0252729 discloses germanosilicate molecular sieve CIT-15 and its synthesis from hydrothermally-derived CIT-13 germanosilicate. Treatment of germanosilicate CIT-13 with concentrated mineral acid at elevated temperature produced a two-dimensional phyllosilicate which, upon calcination, undergoes topotactic dehydration to form molecular sieve CIT-15, a material having a three-dimensional framework with pores defined by 10-ring channels, the channels having dimensions of about 5.6 Å×3.8 Å.

For catalytic applications, incorporation of catalytic active sites, such as aluminum atoms, is important to impart acidic properties to a molecular sieve.

Accordingly, it has now been found that molecular sieve CIT-15 with aluminum incorporated into the molecular sieve framework structure can be prepared from aluminogermanosilicate CIT-13.

SUMMARY

In one aspect, there is provided a method of synthesizing an aluminogermanosilicate molecular sieve having the structure of CIT-15, the method comprising: (a) treating an aluminogermanosilicate CIT-13 molecular sieve with a liquid solvent system under conditions sufficient to degermanate at least a portion of the aluminogermanosilicate CIT-13 molecular sieve to provide a phyllosilicate comprising delaminated cfi-layers, wherein the liquid solvent system is water; and (b) calcining the phyllosilicate under conditions sufficient to convert the phyllosilicate to an aluminogermanosilicate CIT-15 molecular sieve.

In another aspect, there is provided a process for dewaxing a hydrocarbon feedstock which comprises contacting the hydrocarbon feedstock under dewaxing conditions with a catalyst comprising the molecular sieve prepared by the method described herein.

DETAILED DESCRIPTION

Definitions

In this specification, the following words and expressions, if and when used, have the meanings ascribed below:

The term "molecular sieve" refers to a crystalline microporous material that that comprises a three-dimensional framework of oxide tetrahedra.

The term "microporous" refers to a material having pore diameters of less than 2 nanometers.

The term "phyllosilicate" refers to a silicate having a two-dimensional layered structure.

The term "silicate" refers to any material containing silicon oxides within its framework structure.

The term "aluminogermanosilicate" refers to any material containing aluminum, germanium and silicon oxides within its framework structure.

The term "n-ring" represents the number of tetrahedral atoms defining the size of a pore.

The term "degermanate" refers a process according to which at least a portion of the germanium atoms contained in a molecular sieve framework is removed.

The term "germanium-rich" refers to compositions having sufficient germanium to favor a delamination as described below. Generally, such delaminations occur with materials having $SiO_2/GeO_2$ molar ratios of less than 6, 5.6, 5.4, 5, 4.4, or 4.35. When used in the context of the d4r composite building unit (e.g., "germanium-rich d4r units"), the germanium content is much higher, and the $SiO_2/GeO_2$ molar ratios can approach or be practically zero (i.e., these units are practically entirely germanium oxides). By contrast, when used in the context of an overall composition, the term "silicon-rich" refers to a composition which is not prone to delamination, presumably because the silicon content in the joining units is too refractory.

Synthesis of Aluminogermanosilicate CIT-15

There are no specific restrictions how the aluminogermanosilicate CIT-13 molecular sieve (abbreviated herein as "Al-CIT-13") is provided. The molecular sieve may be either purchased from a commercial source or prepared according to a suitable synthetic process known in the art. Methods for preparing Al-CIT-13 are known in the art and are described, for example, in U.S. Pat. No. 10,155,666. The molecular sieve may be provided in the form of a powder or in the form of a spray powder or a spray granulate.

As taught by U.S. Patent Appl. Pub. No. 2016/0346771, molecular sieve CIT-13 may be described as having a powder XRD pattern exhibiting at least five of the characteristic peaks at 6.45 (±0.2), 7.18 (±0.2), 12.85 (±0.2), 18.26 (±0.2), 18.36 (±0.2), 18.63 (±0.2), 20.78 (±0.2), 21.55 (±0.2), 23.36 (±0.2), 24.55 (±0.2), 26.01 (±0.2), and 26.68 (±0.2) degrees 2-θ. In a separate embodiment, the molecular sieve may exhibit six, seven, eight, nine, or ten of these characteristic peaks.

The Al-CIT-13 molecular sieve may have a $SiO_2/GeO_2$ molar ratio in a range of 3.8 to 6.0 (e.g., 3.8 to 5.4, 3.8 to 5.0, 4.0 to 6.0, or 4.0 to 5.0). Additionally or alternatively, Al-CIT-13 may have a $SiO_2/Al_2O_3$ molar ratio of at least 50 (e.g., 50 to 1000, 50 to 800, 100 to 1000, 100 to 800, 200 to 1000, or 225 to 800).

The aluminogermanosilicate CIT-13 molecular sieve is treated with a liquid solvent system to degermanate at least a portion of the molecular sieve to produce a phyllosilicate. The liquid solvent system employed herein is water.

Preferably, the liquid solvent system does not contain an inorganic acid, an organic acid, or a salt thereof. Examples of inorganic acids include hydrochloric acid, nitric acid, sulfuric acid and phosphoric acid. Examples of organic acids include oxalic acid, formic acid, acetic acid, and propionic acid. In another aspect, the liquid solvent system may not contain an inorganic base, an organic base, or a salt thereof. Examples of inorganic bases include ammonia and alkali or alkaline earth metal hydroxides and carbonates. Examples of organic bases include organic amines.

The resulting phyllosilicate may be described as a two-dimensional material comprising silicon-rich cfi-layers resulting from the delamination of CIT-13, in which the germanium-rich d4r units are removed by hydrolysis, with the corresponding introduction of surface silanol (Si—OH) groups. The resulting phyllosilicates may also be described as aluminogermanosilicate compositions consisting essentially of siloxylated silicon-rich cfi-layers (of the CIT-13 framework). Without intending to be bound by any theory, it is believed that the transformations described herein generally retain the structure of these silicon-rich cfi-layers, and the starting material and final product differ in the ways in which these silicon-rich cfi-layers are joined with one another.

These phyllosilicates may be characterized by a major peak in the powder XRD pattern in a range of from about 6.9 to about 9 degrees 2-θ, such as from 7.0 (±0.2) to 8.1 (±0.2) degrees 2-θ. This major peak is at a higher angle than the corresponding major peak in the germanium-rich aluminogermanosilicate CIT-13 molecular sieve from which it is derived. This shift to higher 2-θ angles in the phyllosilicate is consistent with the removal of the d4r building units and the closer pack stacking of the silicon-rich cfi-layers. Some variance may be seen in the absolute position of this major peak. This can be explained when one appreciates that the peak is attributable to stacked individual layers (i.e., each layer is insufficient to provide a diffraction pattern) and it is only by stacking multiple phyllosilicate layers that a diffraction pattern can be seen. In this case, the stacking appears to be extremely sensitive to trace intercalant impurities (e.g., water) which may exist between phyllosilicate layers, which influences the packing and therefore the location of the diffraction peak. Additionally or alternatively, different levels of silanol pendants may affect the stacking distances. In any case, the d-spacing of the stacked layers is in a range of from 10.5 Å to 11.5 Å.

The phyllosilicate may have a $SiO_2/GeO_2$ molar ratio of at least 25 (e.g., 25 to 200, 25 to 100, 25 to 80, 25 to 60, 50 to 200, 50 to 100, 50 to 80, or 50 to 60). Additionally or alternatively, the phyllosilicate may have a $SiO_2/Al_2O_3$ molar ratio of at least 50 (e.g., 50 to 1000, 50 to 800, 100 to 1000, 100 to 800, 200 to 1000, or 225 to 800).

The Al-CIT-13 molecular sieve may be treated with the liquid solvent system in (a) at a temperature in a range of from about 20° C. to 100° C. (e.g., 50° C. to 100° C., 60° C. to 100° C., 70° C. to 100° C., from 80° C. to 100° C., or from 90° C. to 100° C.).

The Al-CIT-13 molecular sieve may be treated with the liquid solvent system in (a) for a time in a range of from 30 minutes to 48 hours (e.g., 6 to 36 hours, or 18 to 30 hours).

The weight ratio of the liquid solvent system relative to the aluminogermanosilicate CIT-13 molecular sieve during treatment according to (a) may be in a range of 2:1 to 500:1 or more (e.g., 5:1 to 500:1, 10:1 to 500:1, 50:1 to 500:1, 100:1 to 500, 2:1 to 300:1, 5:1 to 300:1, 10:1 to 300:1, 50:1 to 300:1, or 100:1 to 300:1).

After treating Al-CIT-13 with water according to (a), the resulting phyllosilicate may be separated from suspension. No specific restrictions exist with regard to a suitable separation method and every solid-liquid separation technique is conceivable. Suitable separation methods include filtration such as suction or pressure filtration, centrifugation, and rapid drying such as spray-drying or spray-granulation.

After step (a), the separated phyllosilicate can be subjected to a washing step and/or drying.

Any conceivable washing agent can be used. Washing agents which may be used include water, alcohols (e.g., methanol, ethanol, propanol), or mixtures thereof. Water or a mixture of water and at least one alcohol, preferably water and ethanol, is preferred, with water being particularly preferred as the washing agent. If washing is applied, it is preferred to continue the washing process until the washing water has a conductivity of at most 1,000 μS/cm (e.g., at most 850 μS/cm, or at most 700 μS/cm).

Suitable drying methods include conventional drying in an oven, either as batch or continuous drying process, rapid-drying such as spray-drying or spray-granulation, flash drying, or microwave drying. The drying may be carried out at a temperature in the range of from about 20° C. to 200° C. (e.g., from 80° C. to 190° C., or from 100° C. to 180° C.) in a suitable atmosphere such as technical nitrogen, air, or lean air.

The phyllosilicates are capable of topotactic rearrangements [(re)organizing and (re)assembling] to form CIT-15.

After treating aluminogermanosilicate CIT-13 with water according to (a), the resulting phyllosilicate is subjected to calcination. Upon calcination, the phyllosilicate can undergo topotactic rearrangements to form aluminogermanosilicate CIT-15 molecular sieve (abbreviated herein as "Al-CIT-15").

Topotactic rearrangements can occur with layered materials that contain terminal silanol groups, such as the presently produced phyllosilicate. With calcination, these terminal silanol groups condense, releasing water and forming Si-0-Si bonds. In this process, a 2-dimensional material is converted to a 3-dimensional framework material. Without intending to be bound by any theory, the conversion of the phyllosilicate to CIT-15 is believed to be operating by this mechanism.

The calcining step may be conducted at a variety of temperatures and time periods. Typical peak calcining temperatures often fall within a range of from 350° C. to 925° C. or more (e.g., 350° C. to 800° C., 350° C. to 700° C., 350° C. to 650° C., 350° C. to 600° C., 400° C. to 925° C., 400° C. to 800° C., 400° C. to 650° C., 400° C. to 600° C., 500° C. to 925° C., 500° C. to 800° C., 500° C. to 700° C., 500° C. to 650° C., or 500° C. to 600° C.).

The calcining step may be conducted in a time period that may be in a range of from 30 minutes to 48 hours (e.g., 1 to 24 hours, 1 to 12 hours, 2 to 10 hours, 3 to 8 hours, or 4 to 6 hours).

The calcining step may be conducted in a calcining gas stream that comprises an inert gas (e.g., nitrogen), oxygen, air, or any mixture or combination thereof. In some aspects, the calcining gas stream may comprise air, while in other aspects, the calcining gas stream may comprise a mixture of air and nitrogen. Yet, in certain aspects, the calcining gas stream may be an inert gas, such as nitrogen and/or argon.

The calcining step may be carried out in any number of well-known devices including rotary calciners, fluid bed calciners, batch ovens, and the like.

As taught by U.S. Patent Appl. Pub. No. 2017/0252729, molecular sieve CIT-15 may be described as having a powder XRD pattern exhibiting at least five of the characteristic peaks at 8.15 (±0.2), 10.13 (±0.2), 12.80 (±0.2), 16.25 (±0.2), 19.03 (±0.2), 19.97 (±0.2), 20.33 (±0.2), 23.79 (±0.2), 23.91 (±0.2), 24.10 (±0.2), 24.63 (±0.2), 25.77 (±0.2), 26.41(±0.2), 27.75 (±0.2), 34.7 (±0.2), and 37.78 (±0.2) degrees 2-θ. In separate embodiment, the molecular sieve may exhibit six, seven, eight, nine, or ten of these characteristic peaks.

The present Al-CIT-15 molecular sieve may have a composition, in terms of $SiO_2/GeO_2$ molar ratio, of at least 25 (e.g., 25 to 200, 25 to 100, 25 to 80, 25 to 60, 50 to 200, 50 to 100, 50 to 80, or 50 to 60). Additionally or alternatively, the Al-CIT-15 molecular sieve may have a $SiO_2/Al_2O_3$ molar ratio of at least 50 (e.g., 50 to 1000, 50 to 800, 100 to 1000, 100 to 800, 200 to 1000, or 225 to 800).

The powder X-ray diffraction patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Calcination can also cause minor shifts in the XRD pattern. Notwithstanding these minor perturbations, the basic crystal lattice structure remains unchanged.

Sorption and Catalysis

Al-CIT-15 prepared according to the present method can be used as a sorbent or as a catalyst to catalyze a wide variety of organic compound conversion reactions processes including many of present commercial/industrial importance. Examples of chemical conversion processes which may be effectively catalyzed by the present molecular sieve, by itself or in combination with one or more other catalytically active substances including other crystalline catalysts, include those requiring a catalyst with acid activity.

Where the Al-CIT-15 produced by the present method is to be used as a catalyst, it may be desirable to combine the Al-CIT-15 with another material resistant to the temperatures and other conditions employed in organic conversion processes. Such materials include catalytically active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a catalytically active material in conjunction with the Al-CIT-15 produced by the present method may improve the conversion and/or selectivity of the catalyst in certain organic conversion processes. Inactive materials suitably serve as diluents to control the amount of conversion in a given process so that products can be obtained economically and without employing other means for controlling the rate of reaction. These materials may be incorporated into naturally-occurring clays (e.g., bentonite and kaolin) to improve the crush strength of the catalyst under commercial operating conditions. Such materials (i.e., clays, oxides, etc.) function as binders for the catalyst. It is desirable to provide a catalyst having good crush strength because in a petroleum refinery the catalyst is often subjected to rough handling, which tends to break the catalyst down into powder-like materials, which cause problems in processing. These clay binders have been employed for the purpose of improving the crush strength of the catalyst.

Naturally-occurring clays which can be composited with the Al-CIT-15 produced by the present method include montmorillonite and kaolin families. These families include sub-bentonites, and kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the Al-CIT-15 also include inorganic oxides, notably alumina.

In addition to the foregoing materials, the Al-CIT-15 produced by the present method can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided Al-CIT-15 and inorganic oxide gel matrix vary widely with the Al-CIT-15 content ranging from 1 to 90 wt. % (e.g., 2 to 70 wt. %) of the composite.

In one aspect, the Al-CIT-15 produced herein may be useful as a hydrocarbon dewaxing catalyst. With such an application, it may be desirable employ the Al-CIT-15 in combination with a metal component capable of providing the catalysts with a hydrogenation-dehydrogenation function. Suitable metal components include tungsten, vanadium, molybdenum, rhenium, nickel, cobalt, chromium, manganese, or a noble metal such as platinum or palladium. Such component can be exchanged into the composition, impregnated therein or physically intimately admixed therewith. Such component can be impregnated in or onto it such as, for example, by, in the case of platinum, treating with a solution containing platinum metal-containing ions. Thus, suitable platinum compounds include chloroplatinic acid, platinous chloride and various compounds containing the platinum ammine complex.

The amount of hydrogenation metal or metals may range from 0.1 to 30 wt. %, based on the weight of the catalyst. For example, the amount of hydrogenation metals can be at least 0.1 wt. %, at least 0.3 wt. %, at least 0.5 wt. %, at least 0.75 wt. %, at least 1.0 wt. %, at least 1.5 wt. %, at least 2 wt. %, or at least 5 wt. %. Additionally or alternatively, the amount of hydrogenation metals can be 30 wt. % or less, such as 25 wt. % or less, 20 wt. % or less, 15 wt. % or less, 10 wt. % or less, 5 wt. % or less, or 2 wt. % or less. In aspects where the hydrogenation metal is selected to be one or more noble metals, the amount of hydrogenation metal can be 2 wt. % or less, such as 1.5 wt. % or less or 1.0 wt. % or less. The catalyst containing hydrogenation metal may also be sulfided prior to use.

Catalyst containing Al-CIT-15 produced by the present method are particularly useful in the dewaxing catalysts of lube oil basestocks. Such feedstocks are wax-containing feeds that boil in the lubricating oil range, typically having a 10% distillation point greater than 650° F. (343° C.), measured by ASTM D86 or ASTM D2887. Such feeds may be derived from a number of sources such as oils derived from solvent refining processes such as raffinates, partially solvent dewaxed oils, deasphalted oils, distillates, vacuum gas oils, coker gas oils, slack waxes, foots oils and the like, and Fischer-Tropsch waxes. Preferred feeds are slack waxes and Fischer-Tropsch waxes. Slack waxes are typically derived from hydrocarbon feeds by solvent or propane dewaxing. Slack waxes contain some residual oil and are typically deoiled. Foots oils are derived from deoiled slack waxes. Fischer-Tropsch waxes are prepared by the Fischer-Tropsch synthetic process.

Suitable conditions for dewaxing can include a temperature of from 200° C. to 450° C.; a pressure of from 0 psig to 1000 psig (6.9 MPag); a liquid hourly space velocity of from 0.1 $h^{-1}$ to 10 $h^{-1}$; and a hydrogen/hydrocarbon mole ratio of from 0.5 to 10.

EXAMPLES

The following illustrative examples are intended to be non-limiting.

$SiO_2/Al_2O_3$(SAR) and $SiO_2/GeO_2$ (SGR) molar ratios were determined by inductively coupled plasma (ICP) elemental analysis.

Nitrogen physisorption measurements were performed at 77 K. Samples were first pre-treated at 400° C. for 6 hours in the presence of flowing, dry nitrogen to eliminate any adsorbed volatiles like water or organics. External surface area ($S_{ext}$) and micropore volume ($V_{micro}$) were determined by the t-plot method. Total pore volume ($V_{tot}$) was calculated at $P/P_0$=0.990.

Acid-site density was determined by temperature-programmed desorption (TPD) of n-propylamine to quantify the Brønsted acid-site distribution of a material, such as described by T. L. M. Maesen et al. (*J. Catal.* 1999, 182, 270-273).

Example 1

Synthesis of Aluminogermanosilicate CIT-13 (Al-CIT-13)

A 23 mL Teflon® liner was charged with 10.73 g of an aqueous solution of 1,2-dimethyl-3-(3-methylbenzyl)imidazolium hydroxide (19.42 wt. %) and 0.40 g of $GeO_2$. Then, 0.35 g of 385HUA Y-zeolite (Tosoh, $SiO_2/Al_2O_3$ mole ratio=100) and 0.58 g of 390HUA Y-zeolite (Tosoh, $SiO_2/Al_2O_3$ mole ratio=500) were added. Water was evaporated by gently blowing a stream of $N_2$ over the liner. When a $H_2O/(SiO_2+GeO_2)$ mole ratio of 10 was achieved, 0.40 g of HF was added and the mixture was homogenized with a spatula. Finally, 0.03 g of germanosilicate CIT-13 seeds (lacking any aluminum) was added and the mixture was homogenized with a spatula. The final molar ratio of the resulting gel was as follows:

1 $SiO_2$: 0.005 $Al_2O_3$: 0.25 $GeO_2$: 0.625 OSDA-OH: 0.625 HF: 12.5 $H_2O$ The liner was sealed in an autoclave and heated at 160° C. under tumbling conditions (43 rpm). Small quantities of product were sampled periodically by powder XRD until a pure phase product was obtained. The solid products were recovered by centrifugation, washed with deionized water and methanol and then dried in an oven at 95° C.

Additional examples were prepared as described above except that the ratio of 385HUA Y-zeolite to 390HUA Y-zeolite was varied to make gels having molar ratios within the following ranges:

1 $SiO_2$: 0.002-0.004 $Al_2O_3$: 0.25 $GeO_2$: 0.625 OSDA-OH: 0.625 HF: 12.5 $H_2O$

Figure 1:
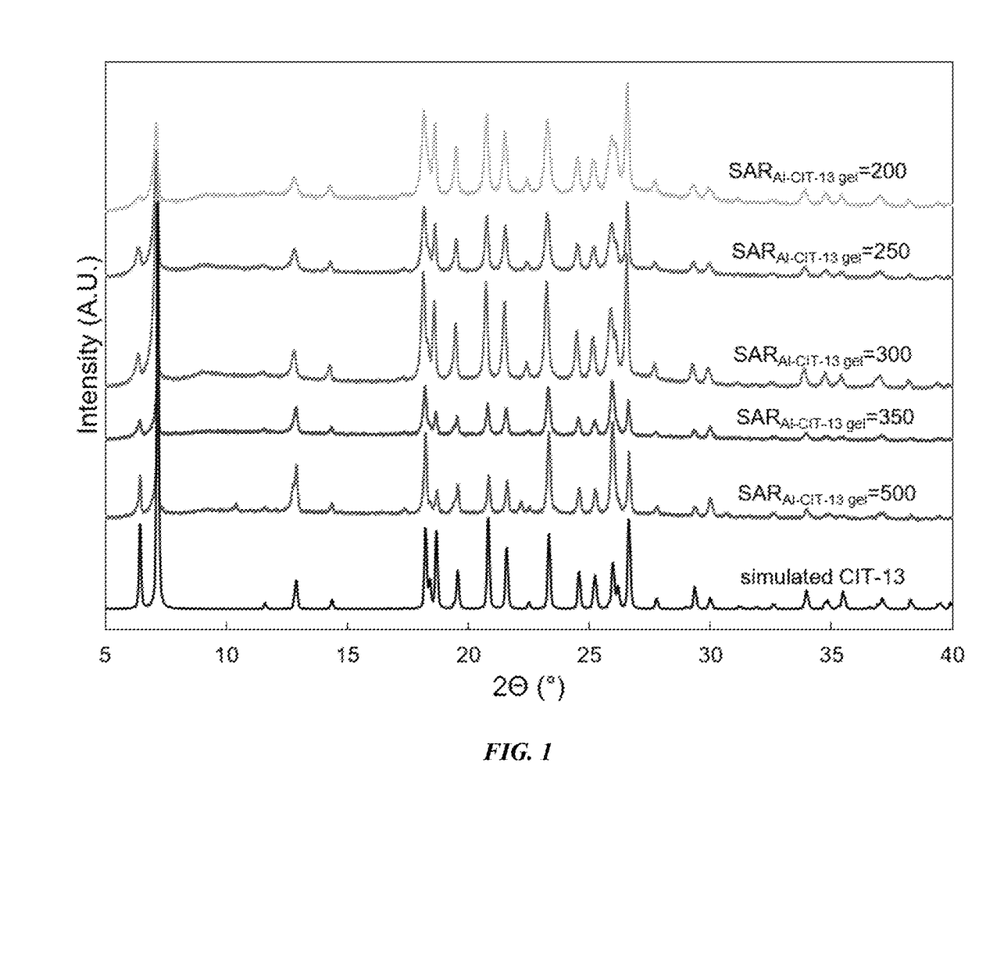
FIG. 1 shows a comparison of the powder X-ray diffraction (XRD) patterns of the as-synthesized aluminogermanosilicate CIT-13 molecular sieve products of Example 1 with the simulated powder XRD pattern for CIT-13.
Figure 2:
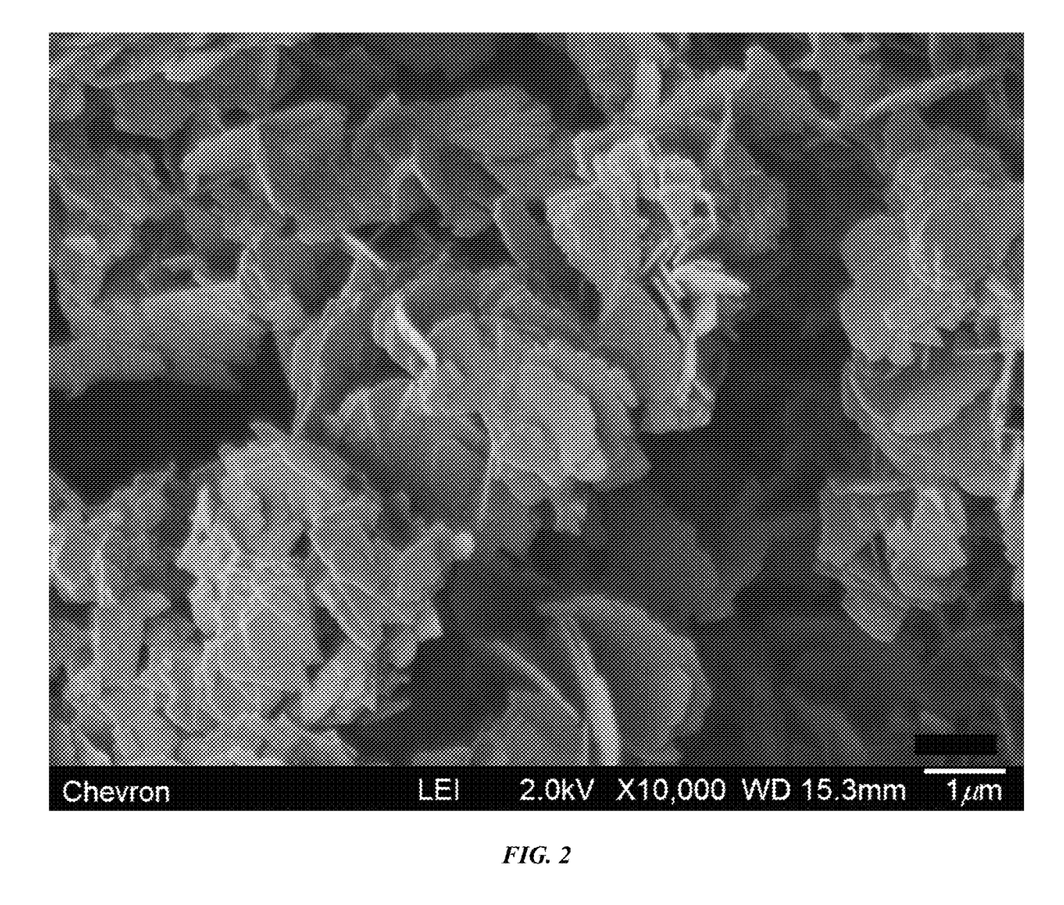
FIG. 2 shows a Scanning Electron Micrograph (SEM) image of an as-synthesized aluminogermanosilicate CIT-13 molecular sieve product of Example 1.

The powder XRD patterns of each product are shown in FIG. 1 are consistent with each product being CIT-13. FIG. 2 shows a SEM image of an as-synthesized Al-CIT-13 molecular sieve product.

The chemical properties of each product are summarized in Table 1.

Example 2

Calcination of Al-CIT-13

Each Al-CIT-13 product from Example 1 was calcined at 550° C. for five hours with a ramp rate of 1° C./min in flowing air.

Figure 3:
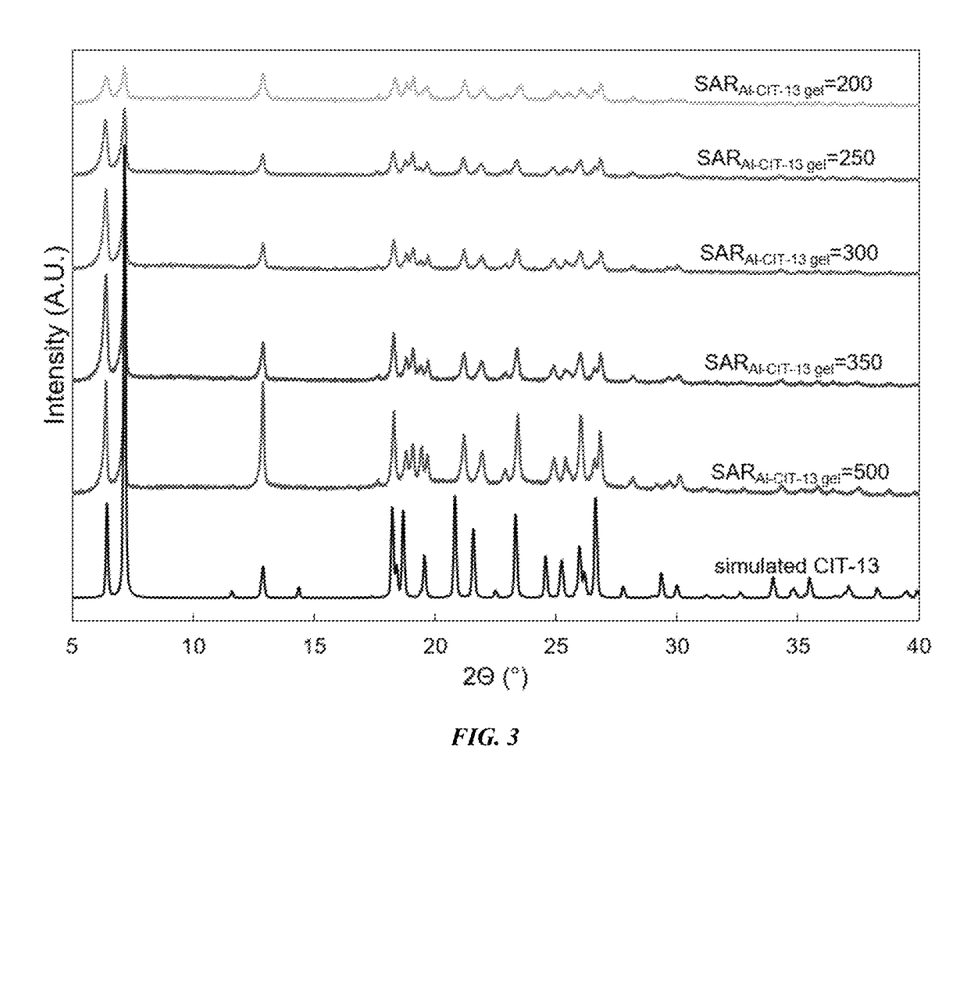
FIG. 3 shows a comparison of the powder XRD patterns of the calcined aluminogermanosilicate CIT-13 molecular sieve products of Example 2 with the simulated powder XRD pattern for CIT-13.

The powder XRD patterns of each calcined Al-CIT-13 product are shown in FIG. 3 and indicates that each material is stable after calcination to remove the OSDA.

Example 3

Synthesis of Aluminogermanosilicate CIT-15 (Al-CIT-15)

Each calcined Al-CIT-13 (0.1 g) prepared in Example 2 was separately mixed with 25 mL of deionized water. Each mixture was then heated in a 95° C. oil bath for 24 hours with stirring. Each mixture was then centrifuged, and the recovered solids were dried in a vacuum oven at room temperature. The dried solids were then calcined at 550° C. for five hours with a ramp rate of 1° C./min in flowing air.

Figure 4:
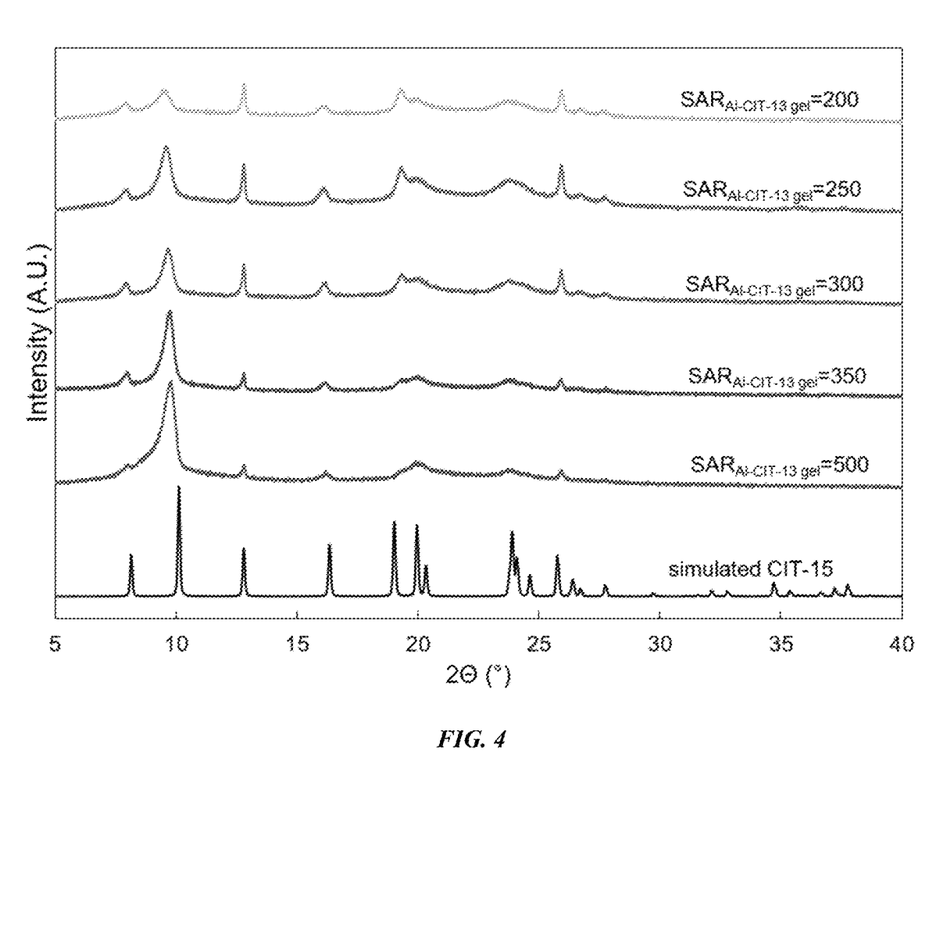
FIG. 4 shows a comparison of the powder XRD patterns of the aluminogermanosilicate CIT-15 molecular sieve products of Example 3 with the simulated powder XRD pattern for CIT-15.
Figure 5:
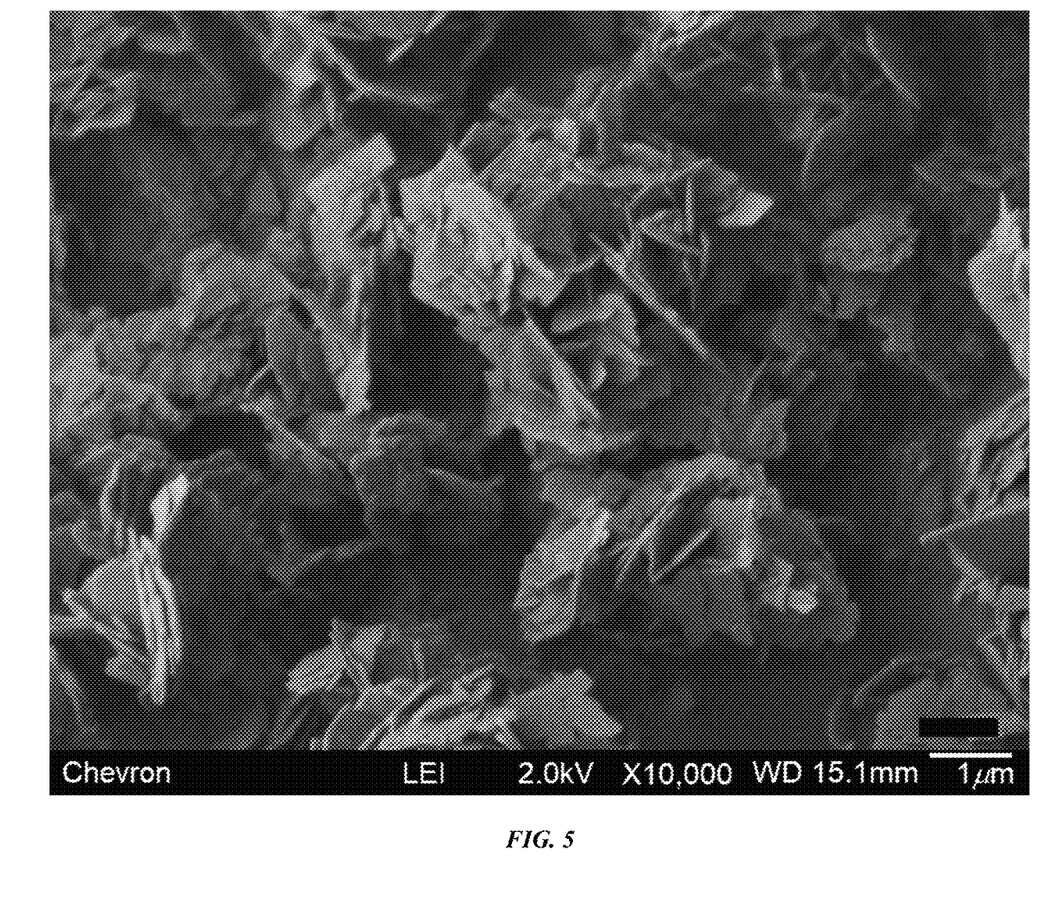
FIG. 5 shows a SEM image of an aluminogermanosilicate CIT-15 molecular sieve product of Example 3.

The powder XRD patterns of each calcined product are shown in FIG. 4 and are consistent with each product being CIT-15. FIG. 5 shows a SEM image of an Al-CIT-15 molecular sieve product.

Example 4

Example 3 was repeated except that the calcined Al-CIT-13 was treated with 0.1 M HCl instead of deionized water.

Figure 6:
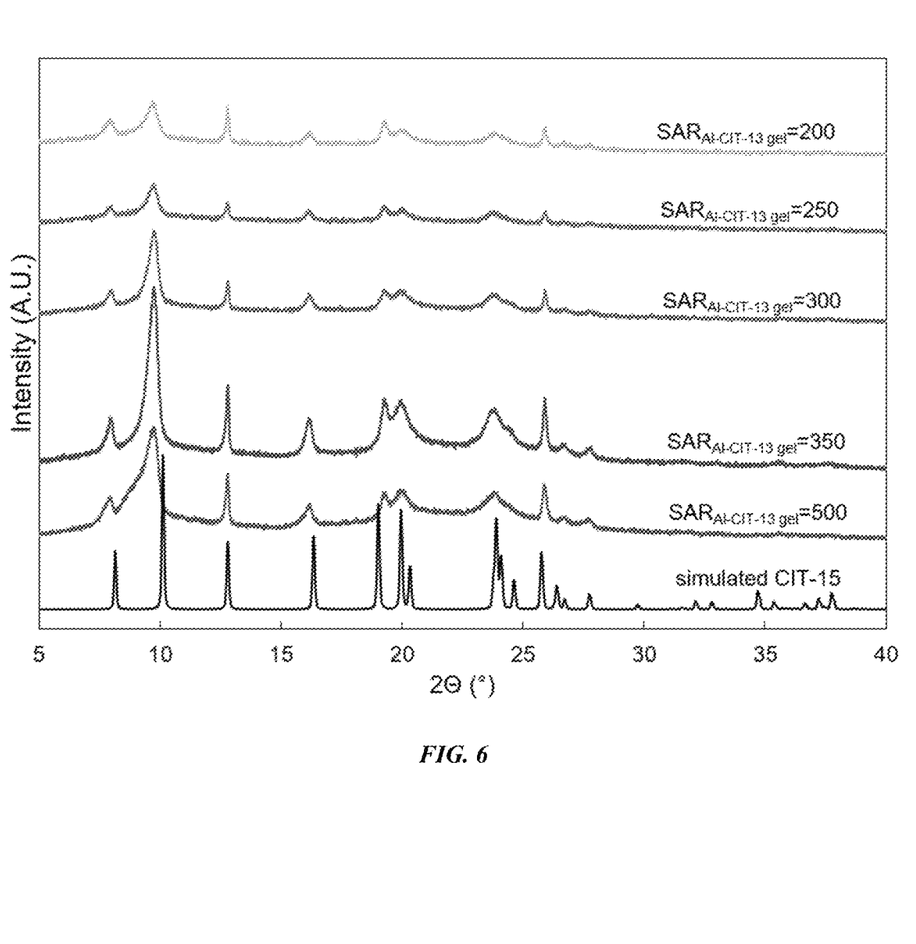
FIG. 6 shows a comparison of the powder XRD patterns of the CIT-15 molecular sieve products of Example 4 with the simulated powder XRD pattern for CIT-15.

The powder XRD patterns of each product are shown in FIG. 6.

A summary of the of the chemical and nitrogen physisorption properties of the products prepared in Examples 1-4 is provided in Table 1.

As shown in Table 1, treatment of Al-CIT-13 with dilute mineral acid as in Example 4 removes aluminum from CIT-13 to provide a CIT-15 material that is catalytically inactive.

TABLE 1

| Example 1 (As-Synthesized Al-CIT-13 Products) | | | | | | | Example 2 (Calcined Al-CIT-13 Products) | | | Example 3 (Al-CIT-15 Products) | | | | | Example 4 (Al-CIT-15 Products) | | | | |
|---|---|---|---|---|---|---|---|---|---|---|---|---|---|---|---|---|---|---|---|
| SAR Gel | SAR Prod. | SGR Gel | SGR Prod. | $V_{micro}$ (cm³/g) | $S_{ext}$ (m²/g) | $V_{tot}$ (cm³/g) | SAR Prod. | SGR Prod. | $V_{micro}$ (cm³/g) | $S_{ext}$ (m²/g) | $V_{tot}$ (cm³/g) | SAR Prod. | SGR Prod. | $V_{micro}$ (cm³/g) | $S_{ext}$ (m²/g) | $V_{tot}$ (cm³/g) | | | |
| 200 | 228 | 4 | 6 | 0.1404 | 67.04 | 0.2956 | 167 | 54 | 0.0243 | 31.50 | 0.2013 | 1395 | 41 | 0.0189 | 29.40 | 0.1638 | | | |
| 250 | 294 | 4 | 6 | 0.1445 | 60.84 | 0.2632 | 243 | 52 | 0.0184 | 24.07 | 0.1503 | 1803 | 40 | 0.0143 | 23.09 | 0.1234 | | | |
| 300 | 389 | 4 | 6 | 0.1434 | 56.09 | 0.2280 | 350 | 52 | 0.0124 | 17.00 | 0.0964 | 2042 | 36 | 0.0087 | 15.57 | 0.1351 | | | |
| 350 | 473 | 4 | 5 | 0.1417 | 49.70 | 0.2191 | 437 | 52 | 0.0102 | 12.30 | 0.0737 | 2812 | 40 | 0.0087 | 12.63 | 0.0868 | | | |
| 500 | 784 | 4 | 5 | 0.1063 | 23.67 | 0.1284 | 377 | 47 | 0.0112 | 4.23 | 0.0432 | 2174 | 40 | 0.0191 | 3.91 | 0.0518 | | | |

Example 5

The acid-site density of each of the products prepared in Example 3 and Example 4 was determined by temperature-programmed desorption of n-propylamine. The results are set forth in Table 2.

TABLE 2

| | Example 3 Al-CIT-15 Products | | Example 4 Al-CIT-15 Products | |
|---|---|---|---|---|
| Gel SAR | Acid-Site Density (µmol/g) | Desorption Temp. (° C.) | Acid-Site Density (µmol/g) | Desorption Temp. (° C.) |
| 200 | 36 | 350-450 | 4 | 350-450 |
| 250 | 23 | 350-450 | 0 | 350-450 |
| 300 | 13 | 350-450 | 1 | 350-450 |
| 350 | 7 | 350-450 | 0 | 350-450 |
| 500 | 14 | 350-450 | 14 | 350-450 |

The invention claimed is:

1. A method of synthesizing an aluminogermanosilicate molecular sieve having the structure of CIT-15, the method comprising:
   (a) treating an aluminogermanosilicate CIT-13 molecular sieve with a liquid solvent system under conditions sufficient to degermanate at least a portion of the aluminogermanosilicate CIT-13 molecular sieve to provide a phyllosilicate comprising delaminated cfi-layers, wherein the liquid solvent system is water; and
   (b) calcining the phyllosilicate under conditions sufficient to convert the phyllosilicate to an aluminogermanosilicate CIT-15 molecular sieve.

2. The method of claim 1, wherein the treating according to (a) is carried out at a temperature of from about 20° C. to 100° C.

3. The method of claim 1, wherein the treating according to (a) is carried out for a time of from 30 minutes to 48 hours.

4. The method of claim 1, wherein the treating according to (a) is carried out for a time of from 18 to 30 hours.

5. The method of claim 1, wherein in (a), a weight ratio of the liquid solvent system relative to the aluminogermanosilicate CIT-13 molecular sieve is in a range of 2:1 to 500:1.

6. The method of claim 1, wherein in (a), the liquid solvent system does not contain an inorganic acid, an organic acid, or a salt thereof.

7. The method of claim 1, wherein the calcining according to (b) is carried out at a peak calcining temperature of from 350° C. to 925° C.

8. The method of claim 1, wherein the calcining according to (b) is carried out for a time of from 2 to 8 hours.

9. A process for dewaxing a hydrocarbon feedstock, the process comprising contacting the hydrocarbon feedstock under dewaxing conditions with a catalyst comprising the aluminogermanosilicate CIT-15 molecular sieve prepared by the method of claim 1.

\* \* \* \* \*